US005796607A

United States Patent [19]
Le Van Suu

[11] Patent Number: 5,796,607
[45] Date of Patent: Aug. 18, 1998

[54] PROCESSORS, SYSTEMS, AND METHODS FOR IMPROVED NETWORK COMMUNICATIONS PROTOCOL MANAGEMENT

[75] Inventor: Maurice Gilbert Le Van Suu, Romainville, France

[73] Assignee: SGS-Thomson Microelectronics, S.A., Gentilly, France

[21] Appl. No.: 897,395

[22] Filed: Jul. 21, 1997

Related U.S. Application Data

[63] Continuation of Ser. No. 431,152, Apr. 28, 1995, abandoned.

[30] Foreign Application Priority Data

Apr. 28, 1994 [FR] France .................. 94 05354

[51] Int. Cl.$^6$ .................................................. G05B 11/01
[52] U.S. Cl. .................. 364/140.01; 364/140.05; 364/131; 340/310.01
[58] Field of Search ................ 364/130–132, 364/138–141, 146, 147, 180, 184, 187, 191, 192, 492, 528.3, 140.01–140.1; 395/183.12, 830, 200.39, 200.5–200.52, 651–653; 307/38; 340/310.01–310.07

[56] References Cited

U.S. PATENT DOCUMENTS

| | | | |
|---|---|---|---|
| 4,656,593 | 4/1987 | Gleba et al. .................. | 364/492 |
| 5,249,140 | 9/1993 | Kessler ........................ | 364/132 |
| 5,506,767 | 4/1996 | Naylor ........................ | 364/140 |

FOREIGN PATENT DOCUMENTS

| 562 333 | 9/1993 | European Pat. Off. . |
|---|---|---|
| 76 34366 | 11/1976 | France . |
| 320 390 | 12/1988 | France . |

OTHER PUBLICATIONS

Mitel Semiconductor, Microelectronics Products Data Book, 1985, pp. 2–61 through 2–71.

Hamabe, et al., Home Bus System (HBS) Interface LSI and its Standard Protocol Example, Feb., 1986, IEEE Transactions on Consumer Electronics CE–32, No. 1, pp. 9–17.

*Primary Examiner*—Paul P. Gordon
*Assistant Examiner*—Steven R. Garland
*Attorney, Agent, or Firm*—Allen Dyer Doppelt Milbrath & Gilchrist

[57] ABSTRACT

A home automation network, and processors and methods for use in such networks. An innovative communications protocol management processor can be installed either in controller machines and controlled machines. The processor can run both applications programs and network management programs from its associated memory, but different sets of network management programs are used depending on whether the processor is operating a machine of the controller type or of the controlled type.

28 Claims, 2 Drawing Sheets

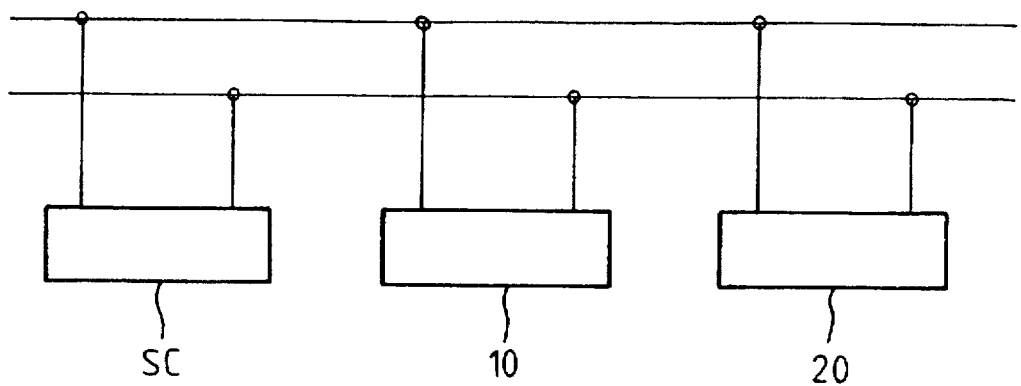
FIG_1
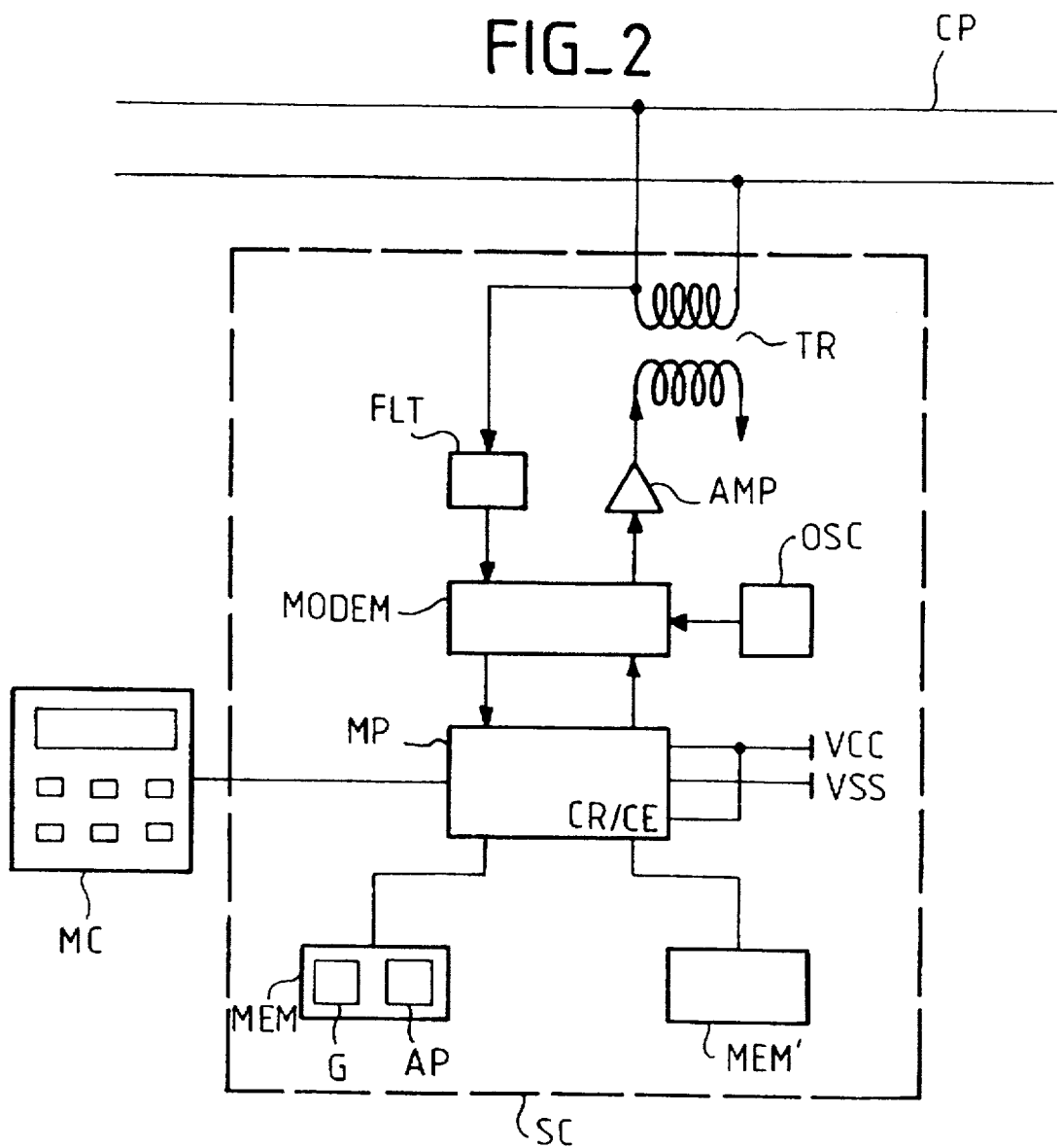
FIG_2

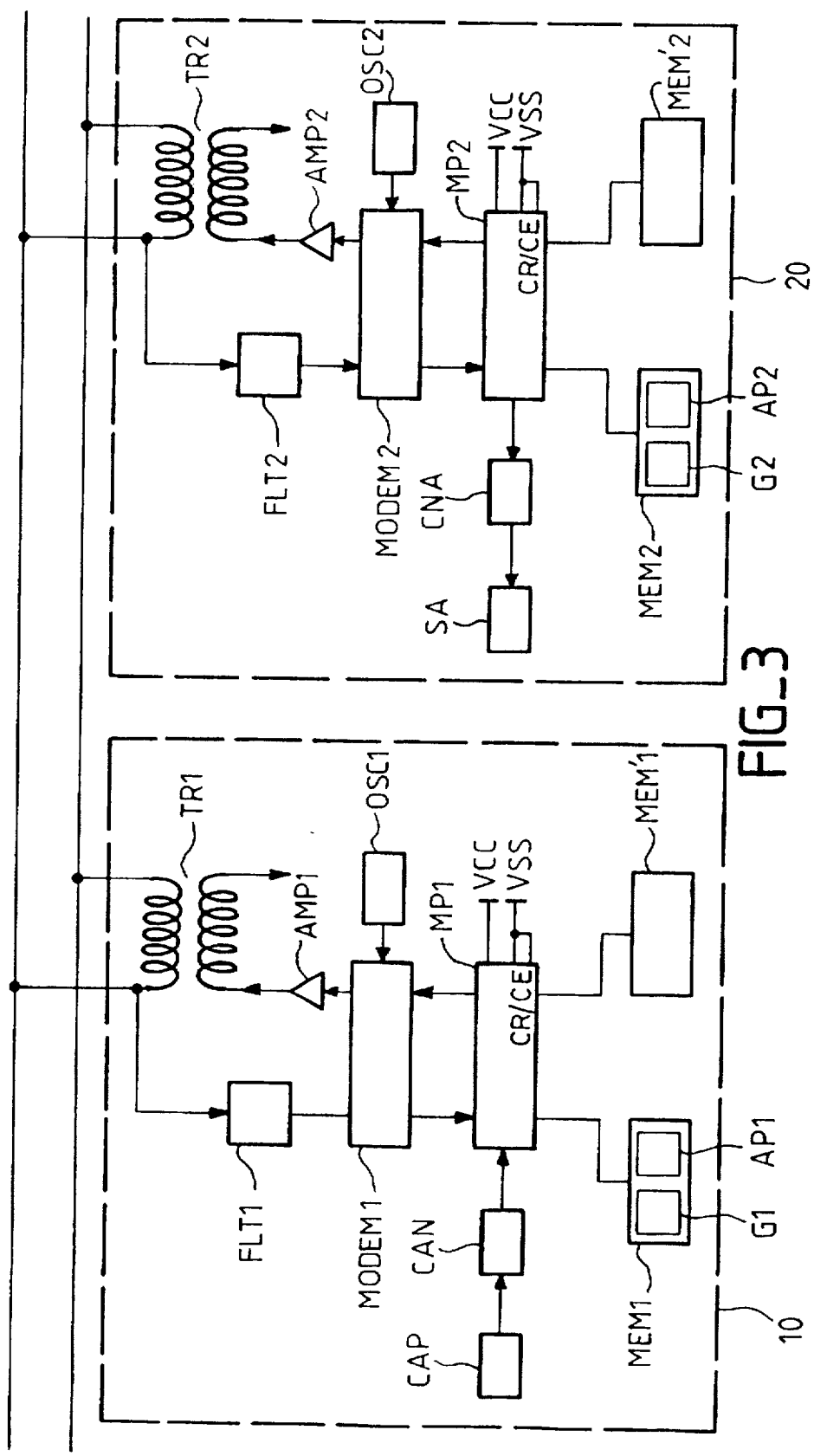

PROCESSORS, SYSTEMS, AND METHODS FOR IMPROVED NETWORK COMMUNICATIONS PROTOCOL MANAGEMENT

CROSS-REFERENCE TO RELATED APPLICATION

This application is a continuation of U.S. Ser. No. 08/431,152, filed Apr. 28, 1995, now abandoned and claims priority to French Application No. 94-05354 filed Apr. 28, 1994, which is hereby incorporated by reference.

BACKGROUND AND SUMMARY OF THE INVENTION

The present inventions relates to a processor dedicated to the management of a communications protocol in a network of machines, distributed along an information transmission line, that can be divided functionally into controller machines on the one hand and controlled machines on the other.

The invention can be applied to particular advantage, but not exclusively, in the field of the computerized management of domestic installations, also called the field of home automation.

Computerized home automation networks generally comprise a plurality of machines distributed over an information transmission line (for example the mains supply system, coaxial cables, twisted pairs, infrared radiation, etc.). These machines may be domestic appliances or machines proper such as television sets, refrigerators, washing machines, radiators, etc., or sensors (for example temperature sensors) or again one or more control stations designed to receive instructions or information elements pertaining to the working of the other machines. These instructions are, for example, on or off commands coming from a user. In turn, the control stations or stations send commands to the other machines of the installation in the form of a message used notably to obtain the desired modifications of operation. For example, after having received an information element from a temperature sensor, a control station will compare this information element with an instructed value given by the user, and, if necessary, depending on the result of the comparison, it will send commands (to radiators) that are on or off commands, or commands to reduce or raise the heating rate. (Additional information on home automation can be found, e.g., in IEE COLLOQUIUM ON 'HOME SYSTEMS—INFORMATION, ENTERTAINMENT AND CONTROL' (1990); Tritton, "Interactive Home Systems (IHS)-an overview," 34 IEEE TRANSACTIONS ON CONSUMER ELECTRONICS 694–9 (1988); Wacks, "The impact of home automation on power electronics," PROCEEDINGS OF IEEE APPLIED POWER ELECTRONICS CONFERENCE (APEC '93) 3–9 (1993); all of which are hereby incorporated by reference.

In a home automation network, it is possible functionally to divide the machines into controller machines and controlled machines.

The controller machines are capable of receiving information elements from one or more machines and of sending them command signals which modify, for example, the mode of operation of these machines.

The controlled machines are capable of sending only information on states (for example the temperature of a room) but not command signals to modify the working of another machine (for example to modify the heating rate of a radiator in the overall context of the management of energy in the installation) in an autonomous way. Typically, the controlled machines are domestic appliances or sensors whereas the controller machines are machines specifically dedicated to the management of the home automation network (management in the sense of the directing of the controlled machines for particular or general applications) according to the instructions given by the user.

Since the field of interest is that of computerized home automation networks in which information elements are exchanged among machines, these machines should be provided with specific means, programmable locally or remotely, so that they can manage the transmission, reception and decoding of the exchanged information elements. Typically, this will be done by means of circuits comprising at least one processor and one or more memories containing programs that implement this processor.

Processors of this kind implement two types of functionally distinct programs, firstly network management programs and secondly applications programs depending on the concerned machine and its operation. Typically, the network management programs are programs relating to the recognition and the shaping of messages to be received or transmitted on the network for the controlling machines as well as for the controlled machines. They are therefore used to carry out protocol-related tasks (tasks related to the exchange protocol used by the machines on the network) such as the coding and decoding of bits, the computation of error correction codes, collision management, etc. that depend on the formal structure of the messages exchanged. The applications programs pertain, generally, to the use that is made of the exchanged information elements. They depend on the machines that implement them and therefore pertain to the individual functional aspect of these machines.

From the viewpoint of the development of the programs, the network management programs are of more particular interest to the manufacturers of the processors likely to be used in the machines of a network while the applications programs enable the customizing of the products and are of more particular interest to the outfitters (manufacturers of machines) who integrate these processors into their products.

In order to facilitate the development work of the outfitters, in the context of communications networks, the manufacturers of processors are turning towards the integration of network management programs specifically dedicated to the management of home automation networks and not only to the management of protocol-related tasks.

Indeed, each type of domestic appliance generally proposes functions that are identical from one machine to another. For example, a washing machine may be characterized by a certain number of application type washing programs, each program being defined by a washing time, a washing temperature, etc. In a home automation network therefore, whichever the outfitter that has manufactured a given type of machine, this machine will be required to implement operating processes that are identical to those of the machines of the same type from rival manufacturers. It is therefore possible to define variables that are common to different machines of one and the same species, for example common variables such as washing time and washing temperature in the case of washing machines.

From this point of view, a manufacturer of processors will have every reason, commercially speaking, to propose network management programs that are oriented to the foreseeable applications of his products and that actually relate to operating mode instructions or to the way in which a home automation installation is managed individually or comprehensively.

For example, the manufacturer of processors could provide management programs in which variables such as washing time and temperature for example are predefined in such a way that an outfitter can be certain that if he sends out an information element relating to washing time to a control station, this information element will be recognized as such by this station.

Similarly, from the viewpoint of the network, it will be advantageous for a manufacturer of processors to propose a product that contains communications programs according to an exchange protocol enabling the recognition of the type of machine used (through the sending, when the machine is connected to the communications network, of a message by this network asking to be taken over by a control station).

In order to minimize the number of processors differentiated by distinct management programs, the manufacturers of processors therefore propose controller or controlled type processors that can implement various types of applications (management of light, heating, etc.). An outfitter will choose, for example, a controller type of processor for installation in a heating control station and the programming of this processor will consist, to put it simply, in indicating that the machine relates to a heating installation.

Up till now, to limit the price of the processors, controller or controlled type processors have been used. Indeed, since a controlled type of machine is not designed to send command messages or instructions in the context of the management of a network of machine, it is not necessary to integrate, into its memories, programs requiring the storage, for example, of the information elements received from the control station or the addresses of the other machines of the same type, in the functional sense, that are present in the network. Consequently, in practice, this means that the sizes of the memories associated with the processors intended for the controlled machines are smaller than the sizes of those intended for the controller machines. It is therefore economically preferable to distinguish the type of machine, whether controlled or controller, for which a processor under development is intended.

It has been noted that this gives rise to two drawbacks.

First of all, in order to promote the widespread use of exchange protocols, efforts have been made towards standardization in order to ensure the inter-operational quality and compatibility of the machines designed to work in one type of network, independently of the manufacturers of these machines. The distinction between controller machines and controlled machines therefore requires the manufacturers of processors to carry out two certification operations (checking of compliance with the standard) for processors which ultimately are fairly close to one another since, in practice, it is only the content of the memories that will differentiate them. Secondly, a manufacturer of processors that are differentiated into controllers and controlled machines cannot optimize his output since he will never be sure of the exact number of orders that he can expect from the outfitters for processors for controller machines and processors for controlled machines.

Hence, the aim of the present invention is to propose a processor dedicated to the management of a communications protocol and designed to be installed in machines distributed along an information transmission line and forming a network, the machines being functionally differentiated into controller machines and controlled machines, the processor implementing programs included in an associated memory, these programs being functionally differentiated into applications programs and networks management programs, wherein:

the network management programs are always different depending on whether the machines are of the controller type or of the controlled type, the memory comprises network management programs associated with controller type machines as well as with controlled type machines, and the processor is provided with selection means for the selective implementation of the network management programs associated with the controller type machines or with the controlled type machines.

The invention therefore proposes the development of only one type of processor integrating the functions proper to controller type applications and to controlled type applications, the differentiation being left to the outfitters.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 1 is a drawing showing an installation comprising a system for the transmission of data between a control station (controller type machine) and several machines (controlled type machines) distributed along the mains supply network.

FIG. 2 is a drawing of the control station of FIG. 1.

FIG. 3 is a diagram of a controlled type machine of FIG. 1.

FIG. 4 shows the typical composition of a message transmitted among the different units of the installation of FIG. 1.

DETAILED DESCRIPTION OF THE PREFERRED EMBODIMENT

The numerous innovative teachings of the present application will be described with particular reference to the presently preferred embodiment (by way of example, and not of limitation), in which:

FIG. 1 shows a schematic view of a data transmission system in a home automation installation comprising a plurality of machines SC, 10, 20, distributed on an information transmission medium, in this case the mains supply network CP (with communications by carrier current). The transmission of the data elements among the different units is done solely through the power distribution circuit. If there were to be a transmission line reserved for the flow of information elements, it could also be used for this purpose. It is also possible to make a system using different media (mains, radiofrequency waves, infrared radiation, coaxial cables, etc.) comprising relay devices to set up bridges between these different media.

The machines constituted by the control station SC and the machines 10, 20 are capable of receiving and sending out data elements, the data elements being transmitted by a modulation of two frequencies. The binary information elements 0 and 1 are represented, for example, by the respective presence of a first modulation frequency of 132 kHz and a second modulation frequency of 133 kHz.

The general constitution of the control station SC is given in FIG. 2. The station preferably has a processor circuit to send out control signals or instructions for the general management of the installation and to receive and process the received signals. This circuit has its own working programs which are controlled by the user, for example by means of a panel MC, comprising a control keyboard and control screen. It is also possible to arrange for the processor circuit to be controlled by a personal microcomputer, the user then being capable of defining the operating programs of the processor as desired.

Apart from a processor MP, its program memory MEM and its working memory MEM', the circuit has the means needed to set up the signals to be transmitted over the mains supply system. These means preferably comprise an oscillator OSC to set up a local carrier frequency. The output of the oscillator is applied through a modulator/demodulator MODEM to an amplifier AMP and the output of the amplifier AMP is applied to the secondary winding of a transformer TR whose primary winding is connected to the mains.

The information elements that come from the mains system and are designed for the control station SC arrive by the transformer TR. They are transmitted to a filtering cell that can be used to detect the presence of a frequency modulation representing the presence of 0 or 1 on the mains. The output of the filtering cell is connected to the MODEM and shaped. The output of this circuit is connected to the processor MP. The signals received through the network from the other machines of the installation are demodulated and converted into sequences of binary pulses that can be used by the processor MP.

FIG. 3 shows the general constitution of the instruments 10 and 20. Their constitution is practically identical to the one shown in FIG. 2, but the instruments 10 and 20 are not controlled by a keyboard and a screen.

In one example, it may be assumed that the machine 10 is a temperature probe, that the machine 20 is a radiator and that the control station SC is designed to control the heating of the home automation installation.

The machine 10 thus comprises a processor MP1 with program memory MEM1 and working memory MEM'1 enabling, firstly, the execution of predetermined operations under the control of the signals received from the control station SC through the mains system, these predetermined operations being contained in the program memory MEM1, and, secondly, the storage, in the working memory MEM'1, of information elements received from a temperature sensor CAP through a converter CAN. It also has a transformer TR1 through which data elements can be transferred to the networks or received from the data network. It also has the modulation, filtering and demodulation means needed to convert these data elements into a form that can be used by the processor: these means are OSC1, MODEM1, AMP1, FLT1, exactly as in the circuit of the station SC.

The machine 20 thus has a processor MP2 with program memory MEM2 and working memory MEM'2. The machine 20 could thus send, for example, command signals to a variable supply source of a resistor (electrical radiator) by means of a converter CNA. It also has a transformer TR2 through which data elements can be transferred to the networks or received from the data network. It also has the modulation, filtering and demodulation means needed to keep these signals in a form that can be used by the processor: these means are OSC2, MODEM2, AMP2, FLT1, exactly as in the circuit of the station SC.

FIG. 4 shows the general structure of a message transmitted by a machine on the network, with notably a preamble PR, a header HDR, an address zone ADD comprising the address of the sender of the message and the address or addresses of the addressees, a data zone DATA and, as the case may be, an acknowledgment zone ACK in which the sender indicates his wish to receive or not to receive an acknowledgment message in response to the message sent.

With regard to the memories associated with the processors of the machines SC, 10, 20, a distinction has been made between, firstly, program memories and, secondly, working memories. Naturally, these memories could be physically one and the same memory, the difference between program memory and working memory being then represented by distinctly determined addressing zones.

The program memories contain programs that can be functionally differentiated into network management programs (G, G1, G2) and application programs (AP, AP1, AP2).

In practice, the network management programs will be contained in masked type memories, namely memories not accessible to the outfitters, so as to permanently ensure compliance with the exchange protocol, harmonizing the operations of different devices (possibly by the laying down of standards), implemented in a network by the machines that have to communicate with one another and are connected to the network.

On the contrary, it is of course clear that the application programs will be advantageously programmed by the outfitters and contained in a memory zone accessible in programming mode so that they can be updated.

In the example described, the processors of the machines SC, 10 and 20 are each provided with a selection pin CR/CE. This pin is designed to receive a signal representing the type of machine (controller or controlled machine). Since the processors are all typically provided with two supply pins, to receive a positive voltage VCC and a ground voltage VSS, it is possible for example to distinguish the types of machines by connecting their pins CR/CE to either of these pins. In the example described, if the pin CR/CE receives the voltage VSS, it is a controlled type machine and if it receives the voltage VCC, it is a controller type machine. When the power is turned on, the processor of the machine, SC or 10 or 20, will read the state of this pin to determine its type. It is also possible to set aside a space of the memories containing the applications programs (AP, AP1, AP2) so that the outfitter stores this information, which is read when the power is turned on.

The last-named approach has the advantage of not calling for any specific pin dedicated to receiving the information element relating to the type of an instrument and hence the advantage of reducing the amount of space taken up by the processor that is contained in this machine.

According to a disclosed class of innovative embodiments, there is provided: A home automation system comprising: a communications channel providing data communication between multiple units; one or more controlled units, each connected to receive commands received through said communications channel and to correspondingly control a local device, but not connected to be able to transmit commands through said communications channel; a controller unit, which is connected to receive external control inputs, and to accordingly send commands through said communications channel to ones of said controlled units; wherein at least one said controlled unit includes a programmable processor and stored programs for both controller and controlled unit operation, and is configured to activate controlled unit operation rather than controller unit operation.

According to another disclosed class of innovative embodiments, there is provided: A power-line communications interface station comprising: interface circuitry for providing a transmit/receive interface to an external communications channel; a programmable processor which is interfaced to the communications channel through said interface circuitry, and which can execute application and network management programs from respective locations of memory; wherein said memory includes not only controlled-unit network management programs, but also controller-unit network management programs which are different from said controlled-unit network management programs; and wherein said processor is nonvolatilely configured to execute either said controlled-unit network management programs or said controller-unit network management programs, but not both.

According to another disclosed class of innovative embodiments, there is provided: A processor dedicated to the management of a communications protocol and designed to be installed in machines that are distributed along an information transmission line and form a network, the machines being functionally differentiated into controller machines and controlled machines, the processor implementing programs included in an associated program memory, these programs being functionally differentiated into network management programs and application programs, wherein: the network management programs are always different depending on whether the machines are of the controller type or of the controlled type, the memory comprises network management programs associated with controller type machines as well as with controlled type machines, and the processor is provided with selection means for the selective implementation of the network management programs associated with the controller type machines or with the controlled type machines.

According to another disclosed class of innovative embodiments, there is provided: A method for operating a home-automation system, comprising the steps of: conducting data communications between one or more controller units and one or more controlled units over a communications channel; controlling local devices by said controlled units, in accordance with commands received through said communications channel; sending commands through said communications channel from said controller units; wherein at least one said controlled unit includes a programmable processor and stored programs for both controller and controlled unit operation, and is configured to activate controlled unit operation rather than controller unit operation.

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. A home automation system comprising:
    a communications channel providing data communication between multiple units;
    at least one controlled unit connected to receive commands received through said communications channel and to correspondingly control a local device but programmed to be unable to transmit commands through said communications channel;
    at least one controller unit, which is connected to receive external control inputs, and to accordingly send commands through said communications channel to said at least one controlled unit;
    wherein said at least one controlled unit includes a programmable processor and stored programs for both controller and controlled unit operation, and is configured to activate controlled unit operation rather than controller unit operation; and
    wherein said stored programs for controller and controlled unit operation define network management programs which are recorded indelibly in a read-only memory, and wherein applications programs of said at least one controlled unit for controlling a local device are recorded in a separable, writable memory that is accessible in a writing mode.

2. The system of claim 1, wherein said communications channel is a power-line communications channel.

3. The system of claim 1, wherein at least one said controller unit is connected to receive control inputs from a manual input connection.

4. The system of claim 1, wherein at least one said controller unit includes a programmable processor and stored programs for both controller and controlled unit operation, and is configured to activate controlled unit operation rather than controller unit operation.

5. The system of claim 1, wherein said at least one controlled unit is configured by an external connection to a constant voltage.

6. The system of claim 1, wherein said at least one controller unit is configured by an external connection to a constant voltage.

7. The system of claim 1, wherein the controlled units can send information elements representing their state, and wherein the controller units comprise means to store the information elements sent by one or more controlled units.

8. A power-line communication interface station comprising:
    interface circuitry for providing a transmit/receive interface to an external communications channel;
    a programmable processor which is interfaced to the communications channel through said interface circuitry, and which can execute application and network management programs from separate respective locations of memory;
    wherein said memory includes not only controlled-unit network management programs, but also controller-unit network management programs which are different from said controlled-unit network management programs, and a separable, writable memory portion to store application programs for at least one controlled unit which controls a local device;
    and wherein said processor is nonvolatilely configured to execute either said controlled-unit network management programs or said controller-unit network management programs, but not both.

9. The station of claim 8, wherein said communications channel is a power-line signal channel.

10. The station of claim 8, wherein said interface circuitry includes a transformer.

11. The station of claim 8, wherein said processor is a 16-bit microcontroller.

12. The station of claim 8, wherein said processor is an 8-bit microcontroller.

13. The station of claim 8, wherein said processor is nonvolatilely configured by an external connection to a constant voltage.

14. A processor dedicated to the management of a communications protocol and designed to be installed in machines that are distributed along an information transmission line and form a network, the machines being functionally differentiated into controller machines and controlled machines, the processor implementing programs included in an associated program memory, these programs being functionally differentiated into network management programs and application programs, wherein:

the network management programs are always different depending on whether the machines are of the controller type or of the controlled type, the memory including a non-volatile memory, network management programs associated with controller type machines as well as with controlled type machines indelibly stored in the non-volatile memory, and a separable writable memory, and the processor is provided with selection means for the selective implementation of the network management programs associated with the controller type machines or with the controlled type machines; and wherein the applications programs of the controlled-type machines for controlling a local device are recorded in the separable, writable memory that is accessible in a writing mode.

15. The processor of claim 14, wherein the machines of the controlled type can send information elements representing their state, and wherein the machines of the controller type can send control information elements to modify the state of one or more machines of the controlled type and comprise means to store the information elements sent by one or more controlled type machines.

16. The processor of claim 14, comprising a selection pin connectable to receive a signal representing the type of machine.

17. The processor of claim 14, wherein a space of the program memory is reserved to store an information element representing the type of machine.

18. The processor of claim 14, connected to be dedicated to the management of a communications protocol in a computerized home automation network.

19. A method for operating a home-automation system, comprising the steps of:

(a.) conducting data communications between at least one controller unit and at least one controlled unit over a communications channel;

(b.) controlling at least one local device by said at least one controlled unit in accordance with commands received through said communications channel;

(c.) sending commands through said communications channel from said at least one controller unit to said at least one controlled unit;

wherein said at least one controlled unit includes a programmable processor, a separable writable memory and nonvolatile memory, and stored programs for both controller and controlled unit operation, and is configured to activate controlled unit operation rather than controller unit operation;

wherein network management programs are recorded indelibly in said memory; and wherein said at least one controlled unit also includes stored application programs for said at least one controlled unit for controlling at least one local device in writable part of the memory.

20. The method of claim 19, wherein each said unit is connected to said channel through interface circuitry which includes a transformer.

21. The method of claim 19, wherein said processor is a 16-bit microcontroller.

22. The method of claim 19, wherein said processor is an 8-bit microcontroller.

23. The method of claim 19, wherein said processor is nonvolatilely configured by an external connection to a constant voltage.

24. The method of claim 19, wherein said communications channel is a power-line communications channel.

25. The method of claim 19, further comprising the step of providing manual inputs to said at least one controller unit to adjust the operation thereof.

26. The method of claim 19, wherein said at least one said controller unit includes a programmable processor and stored programs for both controller and controlled unit operation, and is configured to activate controlled unit operation rather than controller unit operation.

27. The method of claim 19, wherein said at least one controlled unit can send information elements representing its state, and wherein said at least one controller unit can send control information elements to modify the state of said at least one controlled unit and includes means to store the information elements sent by said at least a controlled unit.

28. The method of claim 19, wherein a portion of non-volatile program memory is reserved to store an information element representing the type of machine.

* * * * *

UNITED STATES PATENT AND TRADEMARK OFFICE
CERTIFICATE OF CORRECTION

PATENT NO. : 5,796,607
DATED : August 18, 1998
INVENTOR(S) : Maurice Le Van Suu

It is certified that error appears in the above-identified patent and that said Letters Patent is hereby corrected as shown below:

On the title page

[75] Inventor:    Strike:
" Maurice Gilbert Le Van Suu "

Insert:
-- Maurice Le Van Suu --

Signed and Sealed this

Fifteenth Day of December, 1998

Attest:

BRUCE LEHMAN

Attesting Officer    Commissioner of Patents and Trademarks